(12) United States Patent
Oka et al.

(10) Patent No.: US 9,921,429 B2
(45) Date of Patent: Mar. 20, 2018

(54) DISPLAY DEVICE

(71) Applicant: Japan Display Inc., Tokyo (JP)

(72) Inventors: Shinichiro Oka, Tokyo (JP); Toshinari Sasaki, Tokyo (JP); Yasushi Tomioka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/193,261

(22) Filed: Jun. 27, 2016

(65) Prior Publication Data
US 2017/0003537 A1    Jan. 5, 2017

(30) Foreign Application Priority Data

Jul. 3, 2015 (JP) ................................. 2015-134078

(51) Int. Cl.
| | |
|---|---|
| *G02F 1/1333* | (2006.01) |
| *G02F 1/1335* | (2006.01) |
| *G02F 1/13363* | (2006.01) |
| *G02F 1/1337* | (2006.01) |

(52) U.S. Cl.
CPC .... *G02F 1/13363* (2013.01); *G02F 1/133305* (2013.01); *G02F 1/133634* (2013.01); *G02F 1/133723* (2013.01); *G02F 2001/133633* (2013.01); *G02F 2413/02* (2013.01); *G02F 2413/11* (2013.01)

(58) Field of Classification Search
CPC ................................................ G02F 1/133305
See application file for complete search history.

(56) References Cited

U.S. PATENT DOCUMENTS

| | | | |
|---|---|---|---|
| 2007/0236630 A1 | 10/2007 | Tago et al. | |
| 2013/0265530 A1* | 10/2013 | Fukushima | ......... G02F 1/13363 349/96 |
| 2015/0131031 A1* | 5/2015 | Kim | ..................... G02B 5/3016 349/75 |

FOREIGN PATENT DOCUMENTS

| | | |
|---|---|---|
| JP | 2883941 B2 | 4/1999 |
| JP | 2001-290023 A | 10/2001 |
| JP | 2007-279323 A | 10/2007 |
| JP | 2008-180809 A | 8/2008 |
| JP | 2013-145390 A | 7/2013 |
| JP | 2013-235196 A | 11/2013 |

OTHER PUBLICATIONS

Takahiro Ishinabe et. al., Optical Compensation of Flexible Plastic-Based LCD for Wide Viewing Angle, IDW'13, 2013, pp. 187-188.

* cited by examiner

*Primary Examiner* — Wen-Ying P Chen
(74) *Attorney, Agent, or Firm* — Typha IP LLC (57) ABSTRACT

There is provided a display device including a first base material, a second base material, an optical layer placed between the first base material and the second base material, and a first retardation layer placed in contact with the first base material, wherein the first base material and the second base material are formed from a polyimide, and the first retardation layer and the second retardation layer are liquid crystal layers which are vertically aligned. Providing the first and second retardation layers in contact with the first and second base materials make it possible to achieve a reduction in the thickness of the display device.

19 Claims, 10 Drawing Sheets

DISPLAY DEVICE

CROSS REFERENCE TO RELATED APPLICATIONS

This application is based upon and claims the benefit of priority from the prior Japanese Patent Application No. 2015-134078, filed on Jul. 3, 2015, the entire contents of which are incorporated herein by reference.

FIELD

The present invention relates to a technique of reducing the thickness of a display device and improving its visibility.

BACKGROUND

The display screens of various types of electronic devices such as a personal computer, tablet terminal, and smartphone are formed from display devices called flat panel displays. As display devices used for electric equipment, liquid crystal display devices using the electro optical effects of liquid crystal materials have been proliferated. A liquid crystal display device has a structure with a liquid crystal layer being provided between a first substrate on which a pixel array is provided and a second substrate on which color filters are provided. The liquid crystal display device disclosed in Japanese Patent Laid-Open No. 2007-279323 is further provided with a retardation plate and a polarizing plate.

The retardation plate is provided to compensate for viewing angle dependence occurring in the display device. That is, the retardation plate is used to correct the optical distortion of the display screen of the display device and suppress a change in tonality occurring depending on a viewing angle direction. A retardation plate is prepared by stretching a translucent resin film such that optical anisotropy occurs in the film. Japanese Patent Laid-Open No. 2001-290023 discloses, as another method of prepared a retardation plate, a method of prepared a retardation plate by coating a base material with a polymeric paste. Japanese Patent Laid-Open No. 2008-180809 discloses a method of prepared a retardation plate by coating a base material with a polymeric liquid crystalline monomer.

SUMMARY

According to an embodiment of the present invention, there is provided a display device including a first base material, a second base material, an optical layer placed between the first base material and the second base material, and a first retardation layer placed in contact with the first base material, wherein the first base material comprises a polyimide, and the first retardation layer includes a perpendicularly-oriented liquid crystal layer.

DESCRIPTION OF EMBODIMENTS

An embodiment of the present invention will be described below with reference to the accompanying drawings. Note however that the present invention can be executed in many different modes, and should not be limitedly interpreted by the written content of the embodiment exemplified below. In order to further clarify the following description, the drawings sometimes schematically show the width, thickness, shape, and the like of each portion as compared with an actual mode. However, they are merely examples, and do not limit the interpretation of the present invention. In addition, in this specification and the accompanying drawings, the same reference numerals denote the same elements as those described with reference to the previously referred drawings, and a detailed description of them will be omitted occasionally. Furthermore, the terms "first" and "second" attached to the respective elements are convenient signs to be used to discriminate the respective elements from each other. These terms do not have more meanings unless specifically explained.

In this specification, when a given member or area is located "on (or under)" another member or area, it indicates not only that a given member or area is located immediately above (or immediately below) another member or area, but also that a given member or area is located above (or below) another member or area, unless otherwise specified. That is, this includes a case in which other constituent elements are located between a given member or area and another member or area so as to be located above (or below) another member or area.

A typical liquid crystal device uses glass substrates as a first substrate on which a pixel array is formed and a second substrate on which color filters are formed. Meanwhile, a liquid crystal display device using resin substrates for reductions in thickness and weight is also under development. A polyimide is considered as a suitable material for a resin substrate in terms of chemical stability, mechanical strength, and thermal stability.

A polyimide is known to cause birefringence. When a substrate which transmits light from the illumination light source (backlight) of a liquid crystal display device causes birefringence, a viewing angle dependence appears. That is, the tonality of a video seen from the front of the display screen of the liquid crystal display device changes as compared with that of a video seen from an oblique direction. For this reason, when a polyimide is to be used for a liquid crystal display device, in order to achieve optical compensation, it is necessary to add a retardation plate or retardation film.

If, however, it is necessary to add a retardation plate or retardation film while using a polyimide to achieve a reduction in the thickness of a liquid crystal display device, the value of the attempt to reduce the thickness of a substrate deteriorates. According to an embodiment of the present invention described below, it is possible to achieve a reduction in the thickness of a display device while achieving optical compensation.

A display device according to an embodiment of the present invention will be described with reference to the accompanying drawings. A display device 100 according to the present invention includes a first base material 102 and a second base material 104. The first base material 102 and the second base material 104 each have at least a planar principal surface, and are structured such that the principal surfaces of both the base materials face each other through a gap. In the following description, in a sectional view, the side on which the second base material 104 is placed relative to the first base material 102 is expressed as "on" or "above", and the opposite side is expressed as "under" or "below".

Overview of Display Device

Figure 1:
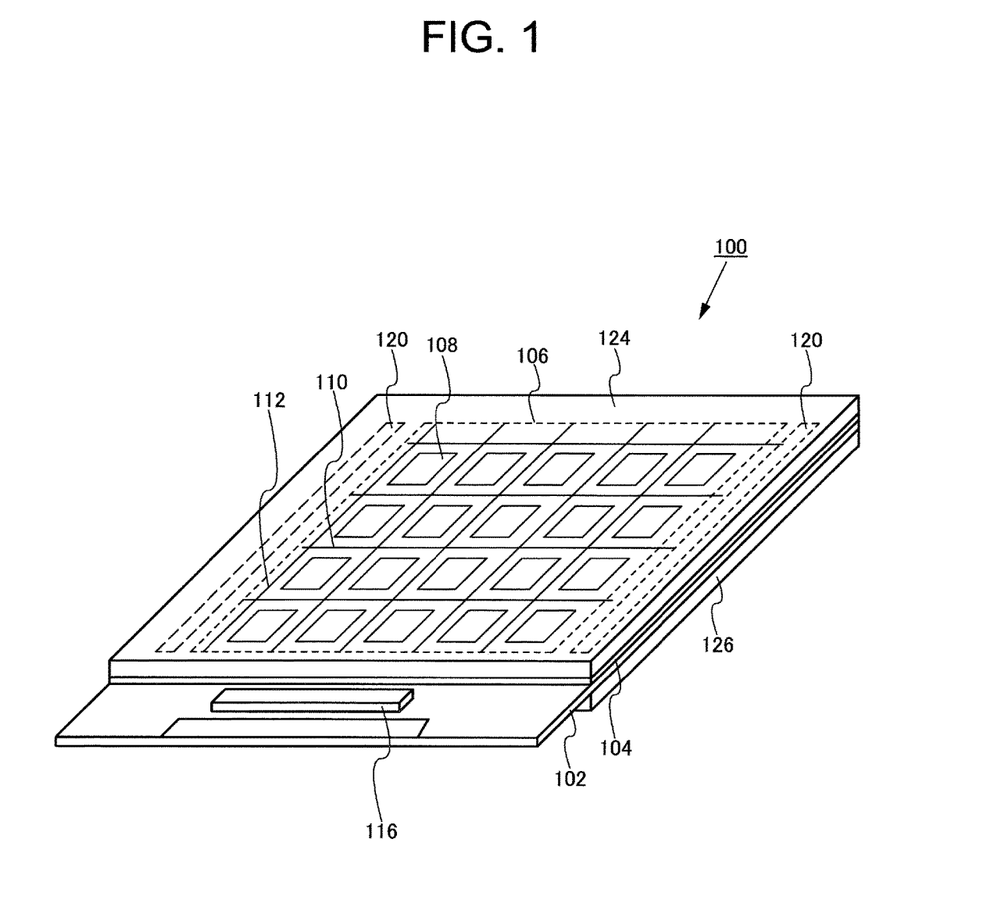
FIG. 1 is a perspective view of a display device according to an embodiment of the present invention.

FIG. 1 is a perspective view of the display device 100 according to this embodiment. In the display device 100, the principal surface of the first base material 102 faces the principal surface of the second base material 104, and a pixel area 106 is provided in an area where the principal surfaces face each other. A plurality of pixels 108 are arrayed in the pixel area 106. An outside area of the pixel area 106 may be provided with a first driving circuit 114 which outputs scanning signals to scanning signal lines 110 and a second driving circuit 116 which outputs video signals to video signal lines 112.

Although not shown in detail in FIG. 1, the first base material 102 faces the second base material 104 through a gap, and an optical layer is provided in the gap portion. The optical layer is provided in the pixel area 106 and has a function of controlling the amount of light emerging from the pixel area 106.

In this embodiment, a polyimide is used as a material for one or both of the first base material 102 and the second base material 104. A polyimide film has high heat resistance, low heat expansion coefficient, high chemical stability, and high elastic modulus as compared with other types of resin films, and hence is suitable as a substrate material forming a structural member of the display device. Using a polyimide in a film form, therefore, makes it possible to achieve reductions in the thickness and weight of the display device. In addition, the polyimide base material has flexibility, and hence allows the formation of a curved display screen by curving the display device.

A polyimide is known to exhibit orientation birefringence caused by its self-orientation and stress birefringence caused by residual stress. In any case, light transmitted through a polyimide causes retardation due to birefringence. Note that retardation indicates an optical path difference caused when light having a polarization plane parallel to the optical axis and light having a polarization plane perpendicular to the optical axis pass through a substance.

In the display device 100, if the first base material 102 and the second base material 104 have birefringence properties, they influence the display quality of a video and cause, in particular, viewing angle dependence. The display device 100 according to this embodiment is provided with a layer for optical compensation to compensate for optical anisotropy caused by the first base material 102 and the second base material 104. FIG. 1 shows a mode in which a first retardation layer 124 is provided on the first base material 102 side, and a second retardation layer 126 is provided on the second base material 104 side. Note that the display device 100 shown in FIG. 1 is merely an example, and may include a mode in which an optical compensation layer is provided only one of the sides of the two substrates as long as it is an arrangement capable of compensating for retardation caused by the first base material 102 and the second base material 104. For example, in a reflective display device, since light is transmitted through only the substrate on the light incident side, an optical compensation layer may be provided on the light incident side.

The display device according to an embodiment of the present invention will be described next with reference to the case of a transmissive display device and the case of a reflective display device. Note that the display device 100 exemplified below uses a liquid crystal layer as an optical layer.

Transmissive Display Device

Figure 2:
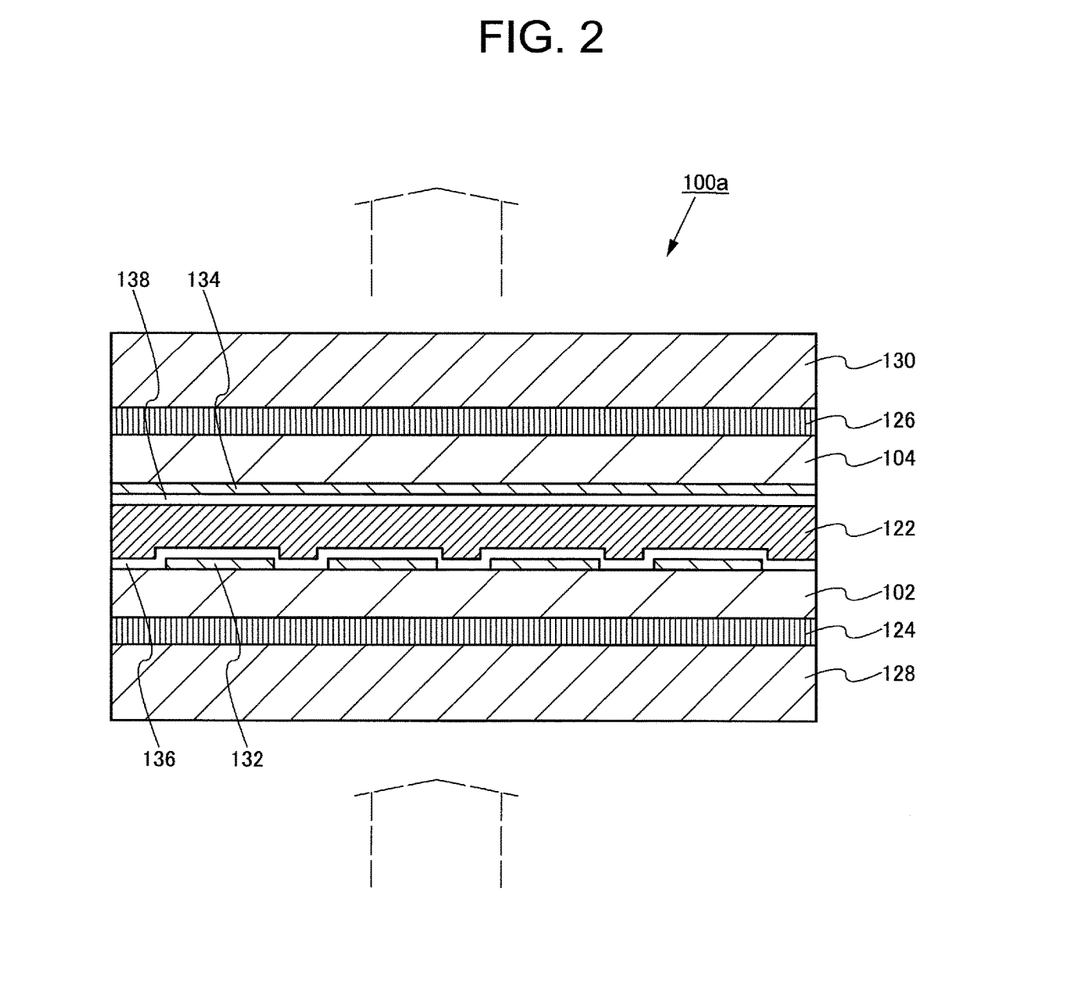
FIG. 2 is a sectional view showing the arrangement of the display device according to the embodiment of the present invention.

FIG. 2 shows the sectional structure of the pixel area 106 of a transmissive display device 100a. A polyimide is used for the first base material 102 and the second base material 104. The first base material 102 faces the second base material 104 through a gap. An optical layer 122 is provided between the first base material 102 and the second base material 104. Pixel electrodes 132 are placed on the first base material 102. A first aligning film 136 is provided on the upper surfaces of the pixel electrodes 132. A counter electrode 134 is placed on the second base material 104 to face the pixel electrodes 132. A second aligning film 138 is provided on the surface of the counter electrode 134 which is located on the optical layer 122 side.

A polyimide used for the first base material 102 has a thickness of 1 μm to 100 μm, preferably 1 μm to 50 μm, and more preferably 3 μm or more as the lower limit of this range. If a polyimide has a thickness of 1 μm or less, the mechanical strength of a support member decreases. If a polyimide is 100 μm or more, the influence of birefringence increases, resulting in influencing a display video. In addition, it is not preferable because the flexibility of the first base material 102 decreases. The same applies to the polyimide used for the second base material 104.

The optical layer 122 is placed between the first base material 102 and the second base material 104. If the optical layer 122 is a liquid crystal layer, an aligning film for aligning a liquid crystal is required. One surface of the optical layer 122 is in contact with the first aligning film 136, and the other surface is in contact with the second aligning film 138. The first aligning film 136 and the second aligning film 138 are formed by using a polyimide for the surfaces of the first base material 102 and the second base material 104 on which the optical layer 122 is provided. However, the polyimide used for the aligning film and the polyimide used for the first and second base materials differ in structural skeleton and weight-average molecular weight because of differences in application and function. That is, the first aligning film 136 may have a thickness that can align a liquid crystal used as the optical layer 122, which is 20 nm to 150 nm. In contrast to this, the polyimide used for the first and second base materials is used for support members for the retardation layer and structural members for sandwiching the optical layer 122, and hence each member has a thickness larger than that of the first aligning film 136. The same applies to the second aligning film 138. In any case, the first aligning film 136 and the second aligning film 138 are preferably thinner than the first base material 102 and the second base material 104. This suppresses the influence of birefringence caused by the aligning films.

The pixel electrodes 132 and the counter electrode 134 have translucency. The pixel electrodes 132 and the counter electrode 134 are formed from transparent conductive films such as ITO (Indium Tin Oxide) or IZO (Indium Zinc Oxide) films.

In the display device 100*a* shown in FIG. 2, light from the illumination light source (backlight) emerges from the first base material 102 side, and light whose transmission amount is controlled by the optical layer 122 is visually recognized as transmitted light. A first polarizing plate 128 is provided on the first base material 102 side, and a second polarizing plate 130 is provided on the second base material 104 side. The first polarizing plate 128 and the second polarizing plate 130 each have, for example, a function of linearly polarizing incident light, and are placed in a crossed Nicol state. A liquid crystal layer used as the optical layer 122 is aligned in a predetermined direction by the first aligning film 136 and the second aligning film 138. Applying a potential difference between the pixel electrodes 132 and the counter electrode 134 will change the alignment of the liquid crystal, thereby performing polarization. The transmissive display device 100*a* controls the amount of light transmitted by a combination of the electro optical effect of the optical layer 122 and the first and second polarizing plates 128 and 130.

In the display device 100*a*, when light from the illumination light source enters the first base material 102, birefringence occurs, resulting in a change in the polarized state of the incident light. The same applies to the second base material 104 which light transmitted through the optical layer 122 enters. A change in polarized state caused by the polyimide used for the first base material 102 and the second base material 104 will influence the viewing angle characteristic and change the tonality when the display screen is viewed from an oblique direction. In addition, this causes the transmission of light through the polarizing plate (also called light leakage), resulting in a reduction in contrast.

Under the circumstance, the present invention provides the retardation layer to compensate for the influence of birefringence caused by the polyimide used for the first base material 102 and the second base material 104. That is, the display device 100*a* is provided with the retardation layer for compensating for the retardation caused by the birefringence of the polyimide. Referring to FIG. 2, the first retardation layer 124 is provided on the first base material 102 side, and the second retardation layer 126 is provided on the second base material 104 side. The first retardation layer 124 is supported by the first base material 102. The second retardation layer 126 is supported by the second base material 104. In this manner, the first base material 102 and the second base material 104 sandwiching the optical layer 122 also function as support base materials for the respective retardation layers, thereby achieving a reduction in the thickness of the display device 100*a*.

The first retardation layer 124 and the second retardation layer 126 can be prepared by using a liquid crystal material having birefringence. When liquid crystal layers are formed as the first retardation layer 124 and the second retardation layer 126, aligning films for controlling the alignment of a liquid crystal are required. In contrast to this, the display device 100*a* according to an embodiment uses, as the first base material 102 and the second base material 104, the polyimide which aligns the liquid crystal material, thereby allowing the omission of aligning films for the retardation layers. Note that the present invention is not limited to this mode, and the surfaces of the first base material 102 and the second base material 104 according to another mode which are in contact with the first retardation layer 124 and the second retardation layer 126 may be provided with polyimide layers which align the liquid crystal material.

A retardation layer is prepared by aligning a polymeric liquid crystalline monomer on at least one of a polyimide member used for each of the first base material 102 and the second base material 104 and curing the polyimide. Each retardation layer may have a thickness that can compensate for retardation caused by the birefringence of the polyimide. A polymeric liquid crystalline monomer is prepared by being vertically aligned to have a phase opposite to the birefringence of the polyimide. As an example of a polymeric liquid crystalline monomer which can be used for a retardation layer, nematic liquid crystal molecules having crosslink ability (cross linkable nematic liquid crystal molecules) can be available. As a cross linkable nematic liquid crystal molecule, there is available, for example, a monomer, oligomer, or polymer having, in one molecule, at least one polymerizable group such as a (meta) acryloyl group, epoxy group, oxetane group, or isocyanate group. A macromolecular polymer can be obtained by applying light or heat to a mixture of these monomers and a light or thermal polymerization initiator.

According to the embodiment of the present invention, since the first base material 102 and the second base material 104 are used as the support substrates for the retardation layers, the thickness of each optical member for compensating for retardation caused by the polyimide increases by only the thickness of the liquid crystal layer. That is, the embodiment of the present invention can omit the use of retardation plates or retardation films and adhesive layers or the like for bonding them to the base materials, which have been required in the related art, and hence can achieve a reduction in the thickness of the display device. In addition, since retardation layers can be directly formed on the first base material 102 and the second base material 104, a manufacturing process can be easily facilitated.

In this case, a retardation Rth in the thickness direction concerning a polyimide and a retardation layer can be explained as follows. Consider the refractive indices of a substance through which light passes as refractive indices ($n_x$, $n_y$, and $n_z$) in the respective directions of the x-axis, y-axis, and z-axis. In this case, when all these refractive indices are the same, the substance is optically isotropic, whereas when some or all of the refractive indices are different from each other, the substance is optically anisotropic.

Figure 7:
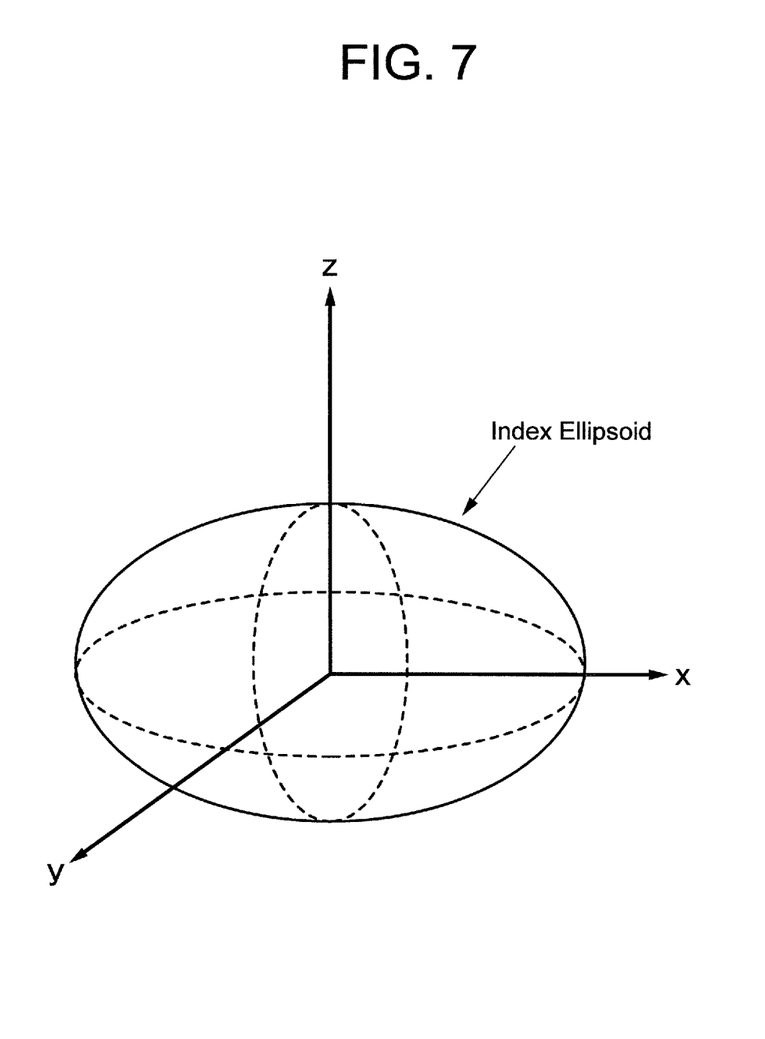
FIG. 7 is a graph for explaining a coordinate system of refractive indices (nx, ny, and nz) in the respective axial directions, with the thickness direction of a given material being the z-axis, and plane directions orthogonal to the thickness direction being the x-axis and the y-axis, respectively.

For the sake of convenience, assume that the thickness direction of a given substance is defined as the z-axis, and plane directions orthogonal to the thickness direction are defined as the x-axis and the y-axis, respectively. FIG. 7 shows the coordinate system of the refractive indices ($n_x$, $n_y$, and $n_z$) in the respective axial directions. In this case, the retardation Rth of a given substance in the thickness direction can be expressed by equation (1):

$$Rth = \left(\frac{nx+ny}{2} - nz\right) \cdot d \qquad (1)$$

Figure 8:
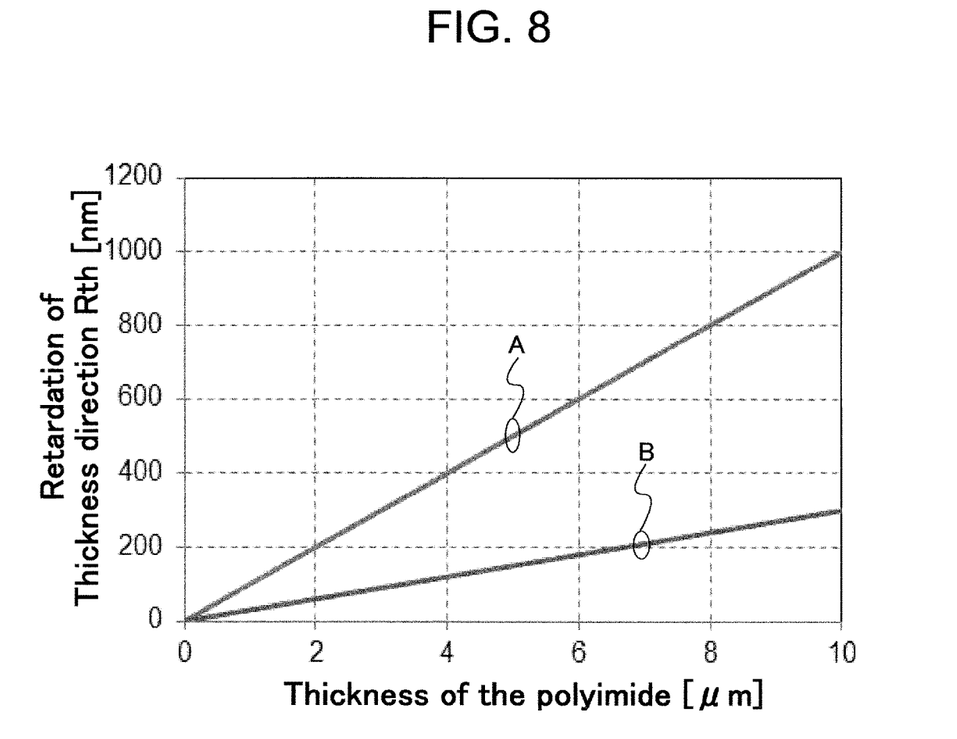
FIG. 8 is a graph showing an example of the thickness dependence of a retardation Rth of a polyimide in the thickness direction.

In the case of a polyimide, nx=ny>nz. Although the front retardation is 0, since Rth becomes positive, this polyimide is called a negative C-plate. As is obvious from equation (1), Rth changes depending on a thickness d. Note that Rth is known to also change depending on the quality of a polyimide. FIG. 8 shows an example of the polyimide thickness dependence of the retardation Rth of each of polyimide (A) and polyimide (B) in the thickness direction. Note that polyimide (A) differs in quality from polyimide (B). In order to compensate for this retardation, retardation layers formed from positive C-plates having the same absolute value may be used. A positive C-plate exhibits nx=ny<nz, and negative Rth. Using positive C-plates having the same absolute values can compensate for the retardation of a polyimide.

Assume that the first base material 102 and the second base material 104 have a thickness of 10 μm, and polyimide (A) shown in FIG. 8 is used as a material for each substrate. In this case, the retardation Rth of the first base material 102 and the second base material 104 in the thickness direction becomes 2000 nm (negative C-plate). For this reason, using a retardation layer formed from a positive C-plate with Rth=−1000 nm can compensate for part of the retardation. Using a retardation layer formed from a positive C-plate with Rth=−2000 nm can cancel the retardation. In this case, since the nearer to −2000 nm the total of the retardations of positive C-plates, the better, a plurality of retardation layers may be used such that the total of the retardations becomes nearer to −2000 nm. For example, in addition to the first retardation layer 124 and the second retardation layer 126, a third retardation layer may be provided on the surface of the first base material 102 which is located on the optical layer 122 side, and a fourth retardation layer may be provided on the surface of the second base material 104 which is located on the optical layer 122 side, within the range of retardation compensation. Note that any types of retardation layers can be used as long as they can reduce the influence of birefringence caused by the polyimide used for the first base material 102 and the second base material 104, and are not limited to the above exemplified values.

As exemplarily shown in FIG. 8, although polyimides whose retardations Rth in the thickness direction differ depending on their qualities are included, the retardation of the polyimide used for the first base material 102 and the second base material 104 per 1 μm of thickness in the thickness direction is preferably larger than 0 and equal to or smaller than 150 nm in absolute value for the following reason. If the retardation per unit length becomes equal to or larger than 150 nm, the retardation increases with an increase in the thickness of the substrate. It is necessary to compensate for the increase in retardation by using a retardation layer. This makes it impossible to sufficiently reduce the thickness of the display device.

The first retardation layer 124 and the second retardation layer 126 each preferably have a retardation of 60 nm of more, in absolute value, per 1 μm of thickness in the thickness direction. If the retardation per unit thickness is 60 nm or more, the thickness of the retardation layer need not be increased beyond necessity.

Although FIG. 2 shows a mode provided with the first retardation layer 124 and the second retardation layer 126, a retardation layer may be provided only one of the first base material 102 side and the second base material 104 side. For example, the retardation of the first retardation layer 124 may be set to allow the first retardation layer 124 to compensate for the retardation caused by the first base material 102 and the second base material 104.

In this case, as a polyimide used for the first base material 102 and the second base material 104, a material is used, which includes a functional group having a function of vertically aligning a polymeric liquid crystalline monomer relative to the substrate surface. In other words, any type of polyimide can be used as long as it has a functional group which vertically aligns a polymeric liquid crystalline monomer. As a functional group which vertically aligns a polymeric liquid crystalline monomer, it is preferable to use one of the following: an alkyl group having a carbon number of 6 or more, a fluoroalkyl group having a carbon number of 6 or more, and an organic group having an aromatic ring or alicyclic skeleton and a carbon number of 6 or more. It is more preferable to use one of the following: an alkyl group having a carbon number of 6 or more and 20 or less, a fluoroalkyl group having a carbon number of 6 or more and 20 or less, and an organic group having an aromatic ring or alicyclic skeleton and a carbon number of 6 or more and 40 or less. Each of these functional groups may be bound, as long as it has liquid crystal orientation, to the main chain of polyamic acid or polyimide directly or through a proper binding group.

Figure 3:
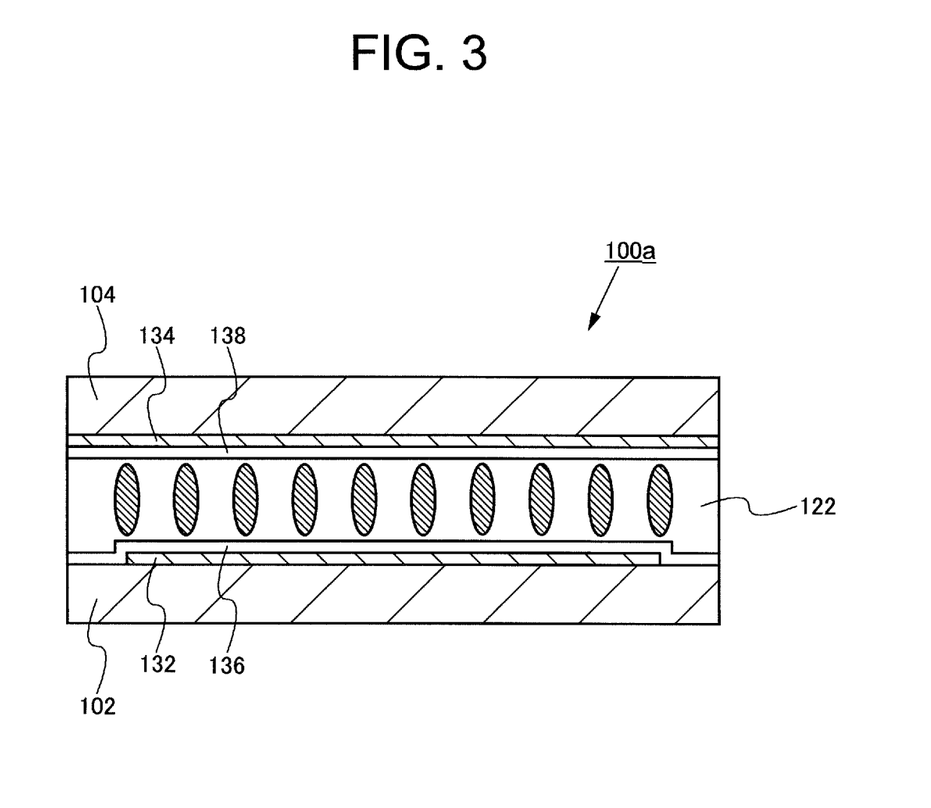
FIG. 3 is a sectional view for explaining the display device according to the embodiment of the present invention.

When a liquid crystal layer is used as the optical layer 122 of the display device 100a, it is preferable to give consideration to the retardation of the liquid crystal layer. As shown in FIG. 3, when a liquid crystal of a vertical alignment system (VA system) is used as the optical layer 122 provided between the first base material 102 and the second base material 104, the liquid crystal layer behaves in the same manner as a positive C-plate. Assume that the retardation Rth of the liquid crystal layer in the thickness direction is −350 nm and the retardation Rth of the first base material 102 and the second base material 104 is 1000 nm. In this case, if a retardation layer for compensating for the retardation has a retardation of −1650 nm, it is possible to cancel the retardation of the polyimide.

In contrast, when the liquid crystal layer is of an in-plane-switching system (IPS), since the retardation of the liquid crystal layer itself in the thickness direction is small enough to be neglected, a retardation may be obtained from the sum of the retardation of the polyimide and that of a retardation layer. Alternatively, a retardation layer may be designed in consideration of the retardation of a cellulose triacetate film (TAC film) used as a protective film for each of the first polarizing plate 128 and the second polarizing plate 130.

According to this embodiment, using a polyimide having a functional group which aligns a polymeric liquid crystalline monomer as the first base material 102 makes it possible to directly provide the first retardation layer 124 for the first base material 102. The same applies to the second retardation layer 126 for the second base material 104. This mode eliminates the necessity to use any support base material for a retardation layer, which has been required in the related art, and can reduce the thickness of the display device accordingly.

Although FIG. 2 shows the mode of providing the first retardation layer 124 on the outside of the first base material 102 (the surface on the opposite side to the surface on which the optical layer 122 is placed), the display device according to the present invention is not limited to this. For example, the first retardation layer 124 may be provided between the first base material 102 and the optical layer 122. The same applies to the second base material 104 and the second retardation layer 126.

Reflective Display Device

Figure 4:
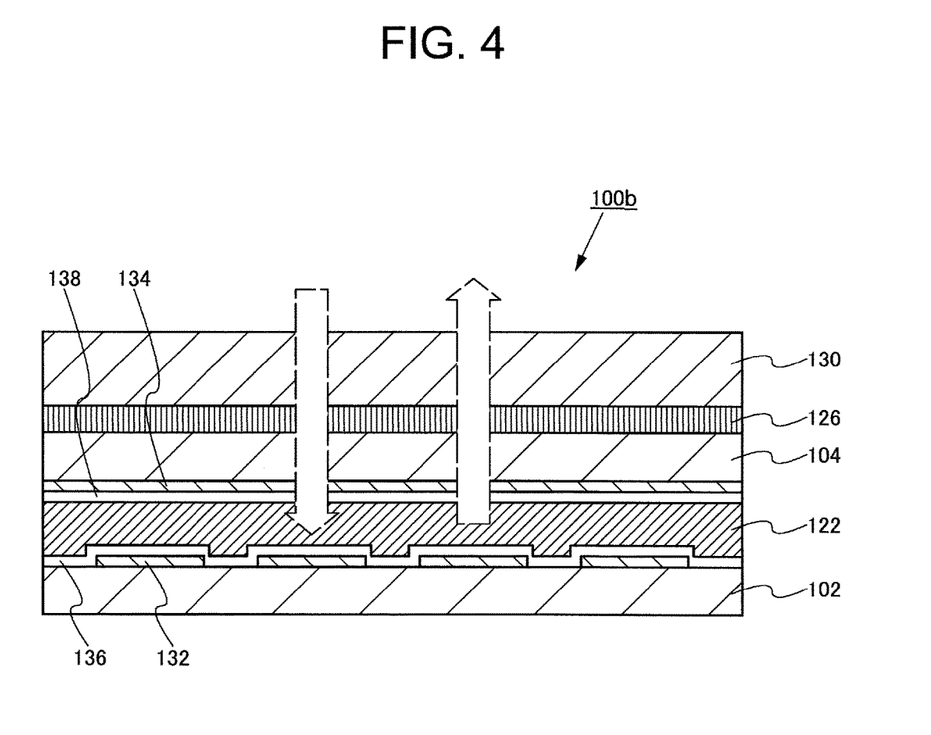
FIG. 4 is a sectional view showing the arrangement of the display device according to the embodiment of the present invention.

FIG. 4 shows the sectional structure of the pixel area 106 of a reflective display device 100b. The following will describe differences from the transmissive display device 100a shown in FIG. 2.

FIG. 4 shows a mode in which a display screen is formed on the second base material 104 side in the reflective display device 100b. In this case, the pixel electrodes 132 are provided with a reflecting surface which reflects incident light. For example, each pixel electrode 132 has a light reflecting surface formed from a metal film, and the metal reflecting surface is formed from, for example, an aluminum or silver film. In addition, the pixel electrode 132 as another form may have a structure having a metal film and a transparent conductive film formed from ITO, IZO, or the like stacked on each other.

The second retardation layer 126 and the second polarizing plate 130 are provided on the second base material 104 side. External light passes through the second polarizing plate 130, the second retardation layer 126, and the second base material 104 and enters the optical layer 122. The light which enters the optical layer 122 and is reflected by the pixel electrodes 132 emerges along a path opposite to the path described above.

In this case, in order to compensate for the retardation caused by the birefringence of the second base material 104, a layer with an opposite phase retardation may be used as the second retardation layer 126. If, for example, a polyimide used for the second base material 104 has the same retardation as that of a negative C-plate, the second retardation layer 126 may have the same retardation as that of a positive C-plate. When a circularly polarizing plate is used as the second polarizing plate, it is preferable to set the retardation of the second retardation layer 126 in consideration of the retardation of a retardation plate (λ/4 retardation plate) forming the circularly polarizing plate. It is possible to reduce the influence of the retardation caused by the birefringence of the second base material 104 in this manner.

In addition, when the optical layer 122 causes a retardation, since exit light displaying a video passes through the optical layer 122 twice, the retardation of the second retardation layer 126 may be set in consideration of this operation. Assume that the optical layer 122 is a vertically aligned liquid crystal layer. In this case, if, for example, the retardation Rth of the liquid crystal layer in the thickness direction is −350 nm and the retardation Rth of the second base material 104 is 1000 nm, it is possible to reduce the retardation of the second base material 104 by half by setting the retardation Rth of the retardation layer to −150 nm, and to totally cancel the retardation by setting the retardation Rth to −650 nm.

As described above, in a case of the reflective display device, since light incident on the panel and reflected light visually recognized as a display image are transmitted through one substrate, a retardation layer for compensating for a retardation may be provided on the one substrate. This can compensate for viewing angle dependence in the use of a polyimide.

Method of Manufacturing Retardation Layer

Figure 5A:
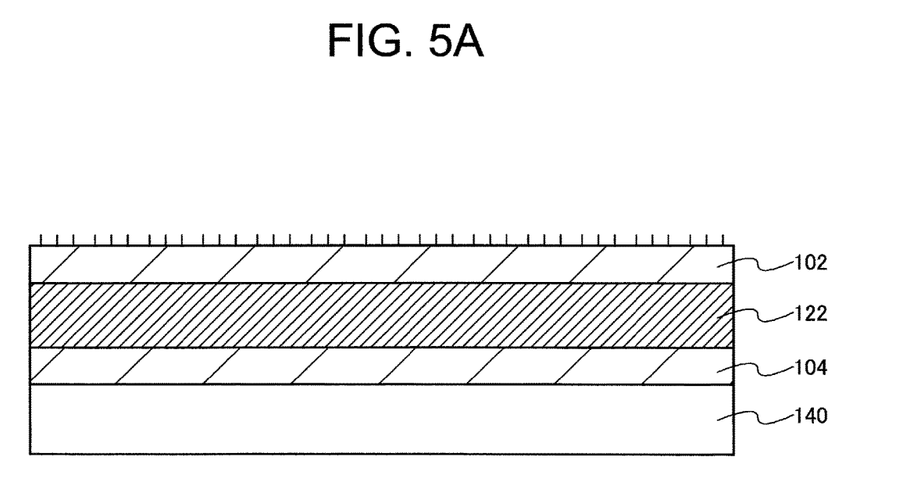
FIG. 5A is a sectional view for explaining a method of manufacturing the display device according to the embodiment of the present invention.
Figure 5B:
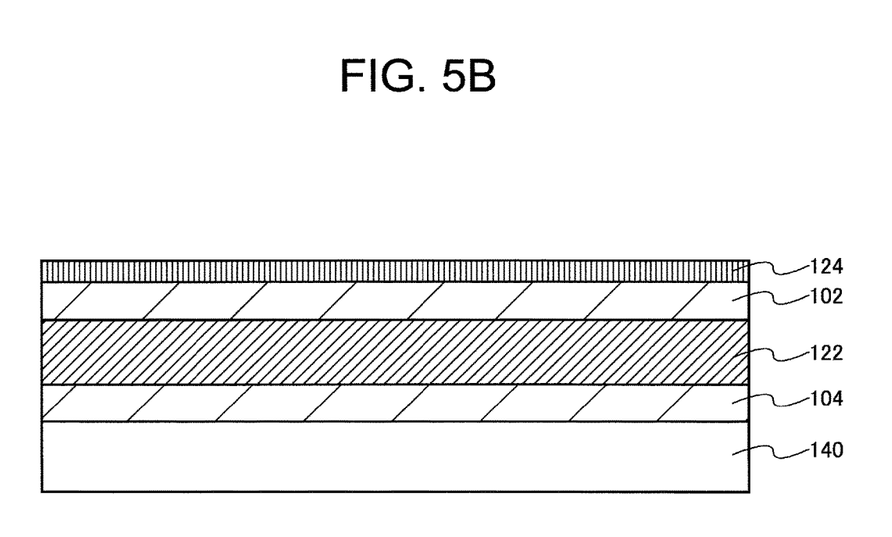
FIG. 5B is a sectional view for explaining the method of manufacturing the display device according to the embodiment of the present invention.
Figure 5C:
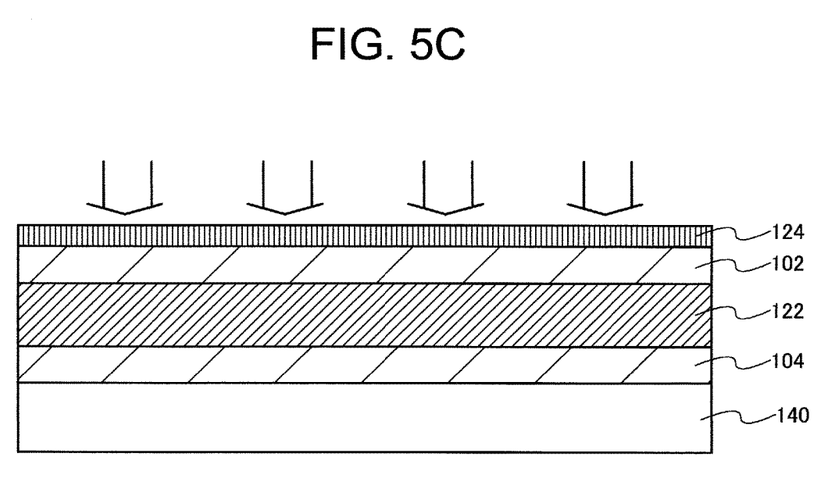
FIG. 5C is a sectional view for explaining the method of manufacturing the display device according to the embodiment of the present invention.

FIG. 5A, FIG. 5B, and FIG. 5C show a process of providing the second retardation layer 126 on the second substrate. FIG. 5A, FIG. 5B, and FIG. 5C each omit an illustration of members such as pixel electrodes and aligning films.

FIG. 5A shows a step in which a display panel is prepared by using a support substrate 140. The display panel supported by the support substrate 140 includes the optical layer 122 provided between the first base material 102 and the second base material 104. A polyimide is used for the first base material 102 and the second base material 104. As described above, a polyimide can be prepared by imidized polyamic acid having a functional group which vertically aligning a liquid crystal and a polymerizable group which undergoes photo-polymerization. The uppermost layer of the first base material 102 is preferably cleaned to improve the orientation and orientation uniformity of a liquid crystalline polymer layer used as a retardation layer.

FIG. 5B shows a step of coating the outer surface of the first base material 102 with a polymeric liquid crystalline monomer. The outer surface is coated with a polymeric liquid crystalline monomer containing a polymerizable group which is cured with ultraviolet light as the first retardation layer 124. FIG. 5C shows a step of curing the first retardation layer 124, provided on the outer surface of the first base material 102, by irradiating the layer with ultraviolet light. In this case, since the polyimide used for the first base material 102 does not transmit ultraviolet light, the optical layer 122 is not irradiated with ultraviolet light. Using a polyimide, therefore, can suppress the light degradation of the optical layer 122 while polymerizing the polymeric liquid crystalline monomer by irradiation with ultraviolet light.

In this manner, the first retardation layer 124 can be provided in contact with the first base material 102. Subsequently, the support substrate 140 may be separated from the second base material 104. When the second retardation layer 126 is to be provided on the second base material 104 side, a display panel can be prepared in the same manner as described above. According to an embodiment of the present invention, using a polyimide containing a functional group which vertically aligns a liquid crystal for the first base material 102 and the second base material 104 makes it possible to provide retardation layers, formed from a polymer liquid crystal, in contact with the substrates. This can achieve a reduction in the thickness of the display device. In addition, since retardation layers can be formed in the process of preparing a display panel, the manufacturing process can be simplified.

Detailed Structure of Pixel

Figure 6:
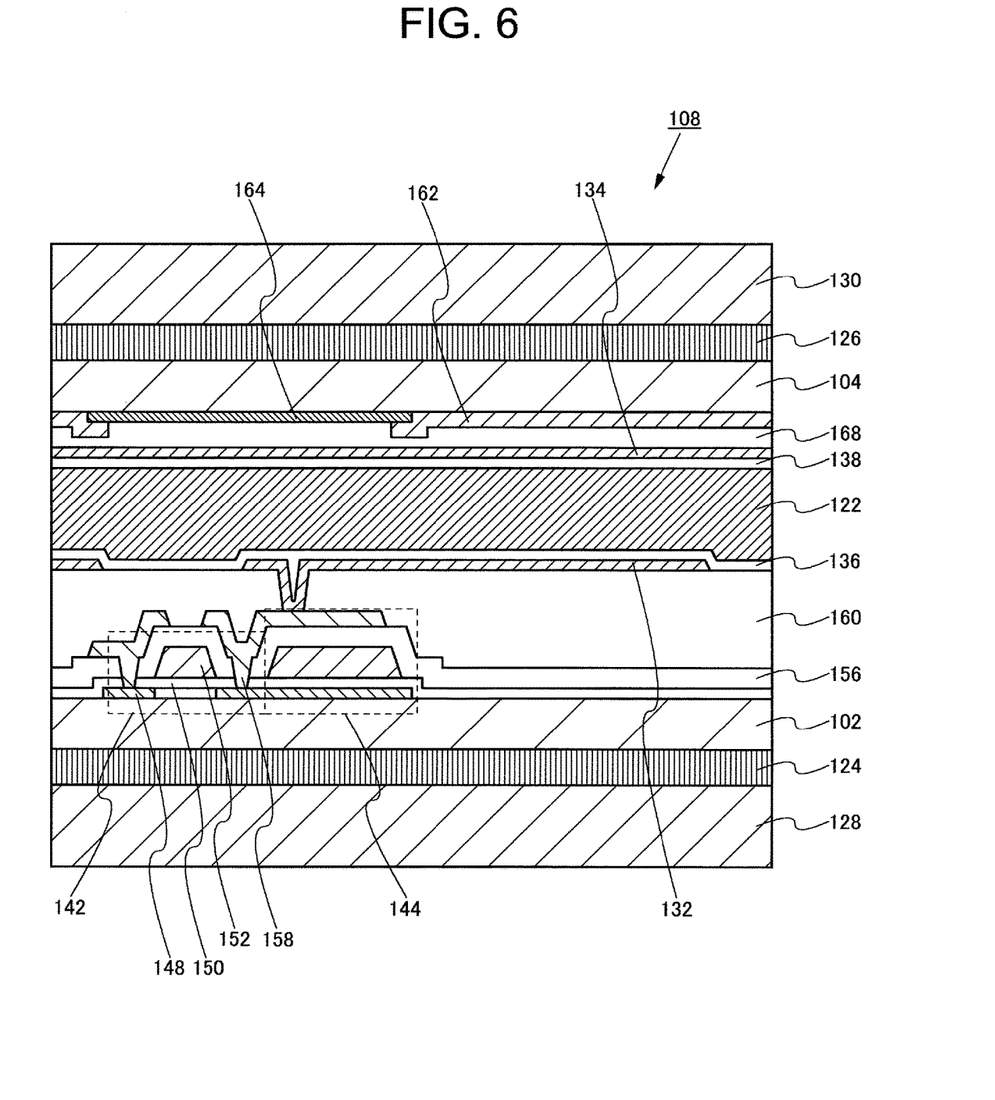
FIG. 6 is a sectional view showing the arrangement of the display device according to the embodiment of the present invention.

FIG. 6 shows an example of the detailed structure of the pixel 108. The pixel 108 includes the pixel electrode 132, the counter electrode 134, the optical layer 122 provided between these electrodes, a transistor 142 electrically connected to the pixel electrodes 132, and a capacitive element 144.

The transistor 142 is provided on the surface of the first base material 102 on which the optical layer 122 is provided. The transistor 142 is an insulated gate field effect transistor having a gate insulating layer 150 between a semiconductor layer 148 and a gate electrode 152. This transistor is also called a thin-film transistor. The semiconductor layer 148 is formed from an amorphous silicon, polycrystalline silicon, oxide semiconductor, or the like. As an oxide semiconductor, indium gallium zinc oxide (IGZO) is preferable in terms of transparency, semiconductor characteristics and crystal stability. Although FIG. 6 shows the transistor 142 with a top gate type structure having the gate electrode 152 provided above the semiconductor layer 148, the transistor 142 may have a bottom gate type structure, as another structure, which has the semiconductor layer 148 provided above the gate electrode.

The pixel electrode 132 is electrically connected to a source drain electrode 158. Insulating layers 156 and 160 are provided between the pixel electrode 132 and the transistor 142. When the display device is of a transmissive, the pixel electrode 132 is formed from a transparent conductive film made of ITO, IZO, or the like. In contrast to this, when the display device is of a reflective, the pixel electrode 132 is formed to include a light reflecting surface including a metal film. The first aligning film 136 is provided on the upper surface of the pixel electrode 132. The first aligning film 136 has undergone an alignment process by a rubbing process or photo-alignment technique.

The second base material 104 is provided with a light-shielding layer 164, a color filter layer 162, and an overcoat layer 168. The light-shielding layer 164 is provided so as to surround a peripheral portion of the pixel electrode 132. The color filter layer 162 is placed to overlap the pixel electrode 132. The overcoat layer 168 is provided on the surface of the color filter layer 162 which is located on the optical layer 122 side. The overcoat layer 168 is formed from a translucent resin to achieve planarization by filling uneven portions formed by the color filter layer 162. The counter electrode 134 is formed from a transparent conductive film made of ITO, IZO, or the like, and is provided on the surface of the overcoat layer 168 which is located on the optical layer 122 side. The second aligning film 138 is provided on the counter electrode 134.

In the structure of the display device shown in FIG. 6, the first retardation layer 124 is preferably provided on the surface of the first base material 102 which is located on the opposite side to the surface on which the transistor 142 is provided. The manufacturing process for the transistor 142 includes a heat treatment. In this process, the first retardation layer 124 is left under a high temperature. In this case, if a polymer liquid crystal is used for the first retardation layer 124, the layer is degraded under the high temperature. For this reason, the first retardation layer 124 is preferably provided on the surface of the first base material 102 which is different from the surface on which the transistor 142 is provided, in order to allow the first retardation layer 124 to be provided after the manufacture of the transistor 142. Note however that when an amorphous silicon or oxide semiconductor is used for the semiconductor layer 148 of the transistor 142, process temperatures in the process are not relatively high. If the first retardation layer 124 can endure the highest process temperature in the manufacturing process, the first retardation layer 124 and the transistor 142 can be provided on the same surface side of the first base material 102. In this case, even if the first retardation layer 124 is provided on the same surface of the first base material 102 as the surface on which the transistor 142 is provided, the first retardation layer 124 can be placed on the lower layer side relative to the transistor 142. In addition, a third retardation layer may be provided on the surface side of the first base material 102 on which the transistor 142 is formed, and the first retardation layer 124 may be provided on the opposite surface side.

As shown in FIG. 6, the second retardation layer 126 is provided on the surface of the second base material 104 which is located on the opposite side to the optical layer 122. This arrangement allows the second retardation layer 126 to be provided without receiving the influences of the yields of the color filter layer 162 and the like. On the other hand, the second base material 104 allows the second retardation layer 126 to be provided on the surface on the same side relative to the color filter layer 162. Providing the second retardation layer 126 on the same inside surface of the second base material 104 as the surface on which the color filter layer 162 is provided will facilitate the manufacturing process for the display device. That is, only the first retardation layer needs to be provided after the preparation of a display panel. According to this structure, a retardation layer manufacturing process to be performed after the preparation of a display panel is required to be performed for only one surface, the number of steps decreases, and manufacture is facilitated as compared with a case in which retardation layers are prepared for the two surfaces of the display panel.

Optical Layer

Although the optical layer 122 is preferably formed from a liquid crystal, micro electro mechanical systems and a light-emitting element can also be used, as will be described later. The driving scheme to be used for a liquid crystal layer is not specifically limited, and it is possible to use various types of driving schemes such as a TN (Twisted Nematic) type, VA (Vertical Alignment) type, MVA (Multi-domain vertical alignment) type, and IPS (In-Plane-Switching) type schemes. FIG. 6 shows a form in which the pixel electrode 132 and the counter electrode 134 are placed on the opposite sides. However, the electrode structure and the electrode arrangement in each pixel can be changed as needed in accordance with the driving scheme for the liquid crystal layer.

The optical layer 122 may be formed by Micro Electro Mechanical Systems (MEMS). For example, in the case of the transmissive display device, the optical layer 122 is configured such that transmitted light is controlled by a MEMS shutter provided for each pixel, whereas in the case of the reflective display device, the optical layer 122 may be configured such that the presence/absence of reflected light incident on each pixel is controlled by a MEMS mirror to display an image. Even in the display device using the optical layer 122 described above, when a circularly polarizing plate is used, since the birefringence of the first base material 102 and the second base material 104 influence exit light, retardation layers which compensate for retardations are preferably provided along the substrates as in this embodiment.

The optical layer 122 may be formed from a light-emitting element. For example, each pixel may be provided with a light-emitting element using an organic electroluminescence material. In this case, the light emission/non-light emission of the light-emitting element is controlled by the same transistor as that shown in FIG. 6. Even in a display device using the optical layer 122 described above, when a circularly polarizing plate is used, since the birefringence of the first base material 102 and the second base material 104 influence exit light, retardation layers are preferably provided.

What is claimed is:

1. A display device comprising:
a first base material;
a second base material;
an optical layer placed between the first base material and the second base material;
a first retardation layer placed in contact with the first base material;
the first base material comprises a polyimide; and the first retardation layer includes a first liquid crystal layer which is vertically aligned, wherein the first base material has a retardation of not more than 150 nm per 1 µm in the thickness direction, and the first retardation layer has a retardation of not less than 60 nm per 1 µm in the thickness direction.

2. The display device according to claim 1, further comprising a second retardation layer placed in contact with the second base material, the second base material comprises a polyimide, and the second retardation layer includes a second liquid crystal layer which is vertically aligned.

3. The display device according to claim 2, wherein a transistor is placed between the first base material and the optical layer, and the second retardation layer is placed on a surface on an opposite side to a surface on which the second base material faces the optical layer.

4. The display device according to claim 2, wherein the second base material has a retardation of not more than 150 nm per 1 µm in a thickness direction, and the second retardation layer has a retardation of not less than 60 nm per 1 µm in the thickness direction.

5. The display device according to claim 1, wherein a transistor is placed between the first base material and the optical layer, and the first retardation layer is placed on a surface on an opposite side to a surface on which the transistor of the first base material is placed.

6. The display device according to claim 3, wherein the second base material has a retardation of not more than 150 nm per 1 µm in a thickness direction, and the second retardation layer has a retardation of not less than 60 nm per 1 µm in the thickness direction.

7. The display device according to claim 2, wherein the polyimide of the second base material includes a functional group having a vertical orientation.

8. The display device according to claim 1, wherein the first liquid crystal layer is polymerized by a polymerizable group which is cured with ultraviolet light.

9. The display device according to claim 2, wherein the second liquid crystal layer is polymerized by a polymerizable group which is cured with ultraviolet light.

10. The display device according to claim 2, wherein the first base material and the second base material have flexibility.

11. The display device according to claim 1, wherein the optical layer comprises a third liquid crystal layer, an aligning film containing a polyimide is placed on a surface of the first base material which is in contact with the third liquid crystal layer, and a thickness of the first base material is larger than a thickness of the aligning film.

12. A display device comprising:

a first base material;

a second base material;

an optical layer placed between the first base material and the second base material;

a first retardation layer placed in contact with the first base material;

the first base material comprises a polyimide; and the first retardation layer includes a first liquid crystal layer which is vertically aligned, wherein the polyimide of the first base material includes a functional group having a vertical orientation.

13. The display device according to claim 12, further comprising a second retardation layer placed in contact with the second base material, the second base material comprises a polyimide, and the second retardation layer includes a second liquid crystal layer which is vertically aligned.

14. The display device according to claim 13, wherein a transistor is placed between the first base material and the optical layer, and the second retardation layer is placed on a surface on an opposite side to a surface on which the second base material faces the optical layer.

15. The display device according to claim 12, wherein the second base material has a retardation of not more than 150 nm per 1 µm in a thickness direction, and the second retardation layer has a retardation of not less than 60 nm per 1 µm in the thickness direction.

16. The display device according to claim 12, wherein a transistor is placed between the first base material and the optical layer, and the first retardation layer is placed on a surface on an opposite side to a surface on which the transistor of the first base material is placed.

17. The display device according to claim 14, wherein the second base material has a retardation of not more than 150 nm per 1 µm in a thickness direction, and the second retardation layer has a retardation of not less than 60 nm per 1 µm in the thickness direction.

18. The display device according to claim 12, wherein the first liquid crystal layer is polymerized by a polymerizable group which is cured with ultraviolet light.

19. The display device according to claim 12, wherein the optical layer comprises a third liquid crystal layer, an aligning film containing a polyimide is placed on a surface of the first base material which is in contact with the third liquid crystal layer, and a thickness of the first base material is larger than a thickness of the aligning film.

* * * * *